(12) United States Patent
Martin-Cocher et al.

(10) Patent No.: US 6,520,480 B2
(45) Date of Patent: Feb. 18, 2003

(54) PLUG CONNECTION WITH OUTLET SHUT-OFF

(75) Inventors: Daniel Martin-Cocher, Grenoble (FR);
Erminio Moretti, Grenoble (FR);
Albert Raymond, Claix (FR)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/967,082

(22) Filed: Sep. 28, 2001

(65) Prior Publication Data
US 2002/0125452 A1 Sep. 12, 2002

(30) Foreign Application Priority Data
Sep. 29, 2000 (DE) .......................................... 100 48 502

(51) Int. Cl.[7] ............................................... F16L 37/40
(52) U.S. Cl. .................................. 251/149.6; 251/149.1
(58) Field of Search ............................ 251/149.1, 149.6

(56) References Cited

U.S. PATENT DOCUMENTS

| | | | | |
|---|---|---|---|---|
| 5,265,844 A | * | 11/1993 | Westfall ................... | 251/149.1 |
| 5,273,254 A | | 12/1993 | McNaughton et al. | |
| 5,485,982 A | | 1/1996 | Gunderson | |
| 5,979,868 A | * | 11/1999 | Wu et al. ................. | 251/149.6 |
| 5,988,705 A | * | 11/1999 | Norkey | |
| 6,050,298 A | * | 4/2000 | Lacroix et al. .......... | 251/149.6 |
| 6,050,544 A | * | 4/2000 | Merunek ................. | 251/149.6 |
| 6,382,599 B1 | * | 5/2002 | Edstrom, Sr. et al. ... | 251/149.6 |

* cited by examiner

*Primary Examiner*—Paul J. Hirsch
(74) *Attorney, Agent, or Firm*—Gifford, Krass, Groh, Sprinkle, Anderson & Citkowski, P.C.

(57) ABSTRACT

A plug connection with an automatically actuated outlet shut-off includes a cylindrical receptacle housing with an opening for inserting a tubular plug-in part that is provided with a circumferential holding rib which can be engaged in a locking element arranged in the inserting region of the receptacle housing. Ring seals for sealing the annular gap between the inner wall of the receptacle housing and the inserted plug-in part are also arranged in the receptacle housing. A valve body is provided in the flow-through chamber of the receptacle housing, wherein the valve body automatically seals the flow-through chamber and is pressed into the open position away from the end face of the plug-in part against the force of a coil spring when the plug-in part is inserted. The valve body is in the form of a sleeve that is closed by an end wall on its end that faces away from the inserting opening and penetrated by a radial rib. Four axially parallel ribs that are uniformly distributed over the circumference are arranged on the rear side of the end wall, such that the ribs are guided in a longitudinally displaceable fashion in corresponding longitudinal grooves in the inner wall of the receptacle housing.

11 Claims, 3 Drawing Sheets

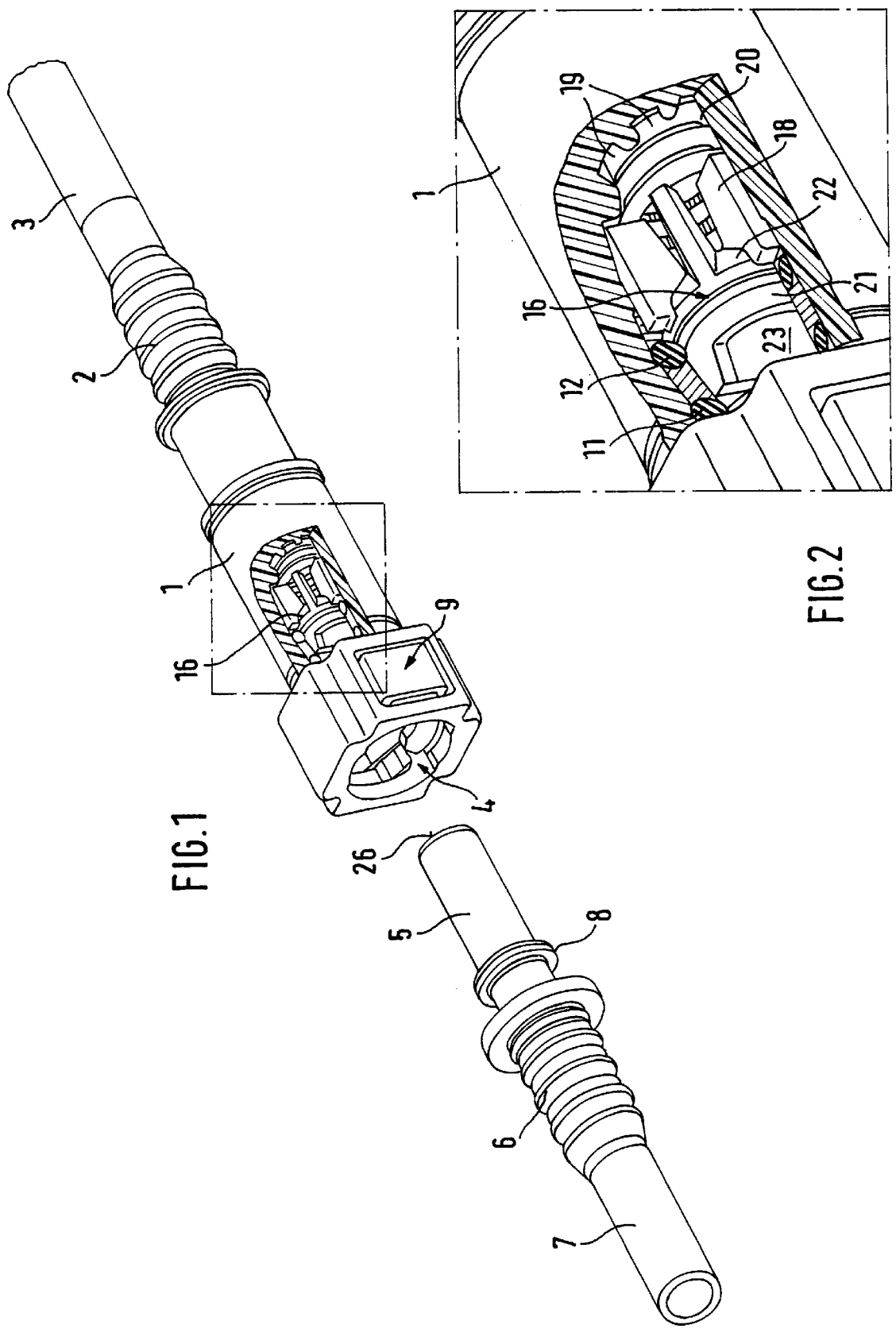

PLUG CONNECTION WITH OUTLET SHUT-OFF

BACKGROUND

1. Field of the Invention

The invention pertains generally to plug connectors, and more specifically to a plug connection with outlet shut-off.

2. Description of Related Art

Plug connections, and in particular a plug connection with outlet shut-off, are frequently used in the automotive industry. For example, they are used to interrupt the fluid flow when an engine is connected to fuel lines, while testing the engine at the production site. The fuel lines are subsequently disconnected from the fuel supply after the test is run in order to be transported to the assembly line, where they are reinstalled and the final connection with the fuel line is made. When this connection is made, the valve body that was previously held in the closed position by the compression spring, is pressed into the open position when the plug-in part is inserted, such that the fuel is able to flow through the plug connection without obstruction.

Thus, there is a need in the art for a plug connection for a conduit that includes an automatic shut-off feature, is simple to assemble, and cost-effective to manufacture.

SUMMARY OF THE INVENTION

One advantage of the present invention is the flawless function of the outlet shut-off, and that the valve body is adequately guided in the receptacle housing and easily installed to ensure the function of the outlet shut-off. Another advantage of the present invention is that the constructive design of the outlet shut-off within the flow-through chamber be simple and that the outlet shut-off be cost-effective.

Accordingly, a plug connection with a valve body is provided in the form of a sleeve that is closed by an approximately conical end wall on its end that faces away from the inserting opening and penetrated by a rib. The valve body includes at least three axially parallel ribs are uniformly distributed over the circumference of the rear side of the end wall, and the ribs are disposed in corresponding longitudinal grooves in the inner wall of the receptacle housing.

The outer wall of the sleeve of the valve body is widened to form a circumferential contact groove. The valve body is pressed against the rear ring seal viewed in the inserting direction in the closed position while the front part of the sleeve extends through the ring seal. The part of the radial rib which protrudes beyond the sleeve is terminated with an edge that is inwardly pressed into the open position away from the end face of the plug-in part during the insertion into the opening.

The inner wall of the receptacle housing is provided with additional longitudinal grooves such that the longitudinal grooves that serve as fluid passages after the valve body is pressed away.

Other features, objectives and advantages of the present invention will be readily appreciated, as the same becomes better understood after reading the subsequent description taken in conjunction with the accompanying drawings.

BRIEF DESCRIPTION OF THE DRAWINGS

FIG. 1 is a perspective view of a plug connection before the plug-in part is inserted, according to the present invention;

FIG. 2 is an enlarged partial sectional view through the housing wall to illustrate the closed valve body according to the plug connection of FIG. 1;

DESCRIPTION OF THE PREFERRED EMBODIMENTS

Figures 3, 4:
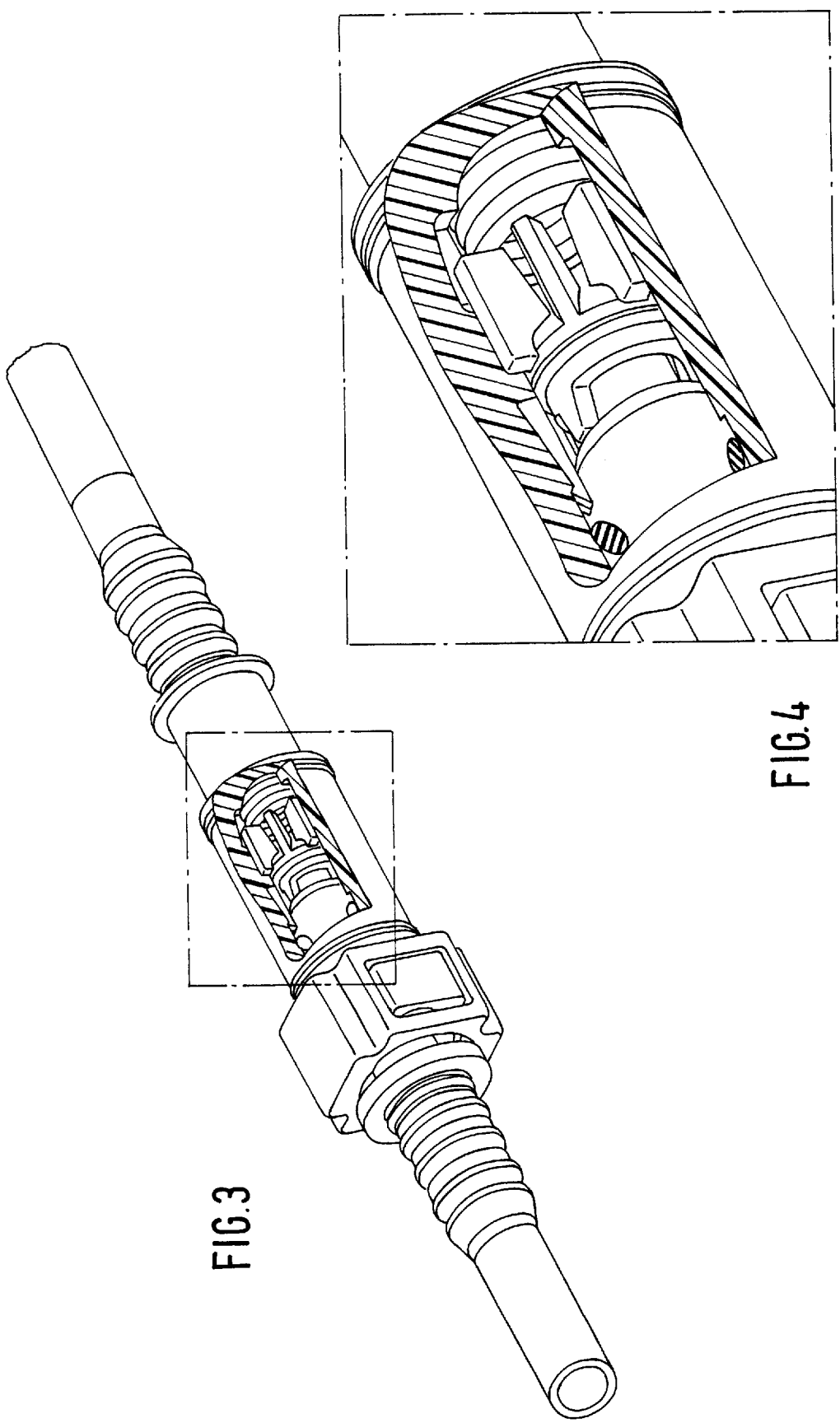
FIG. 3 is a perspective view of the plug connection of FIG. 1 after the plug-in part is completely inserted.
FIG. 4 is an enlarged sectional view through the housing wall to illustrate the opened valve body according to the present invention.

Referring to FIGS. 1–7, a plug connection is illustrated that is used for separably connecting conduits that serve for conveying fluids, and in particular, fuel lines in the automotive industry.

The plug connection includes a cylindrical receptacle housing 1 with a connection piece 2 for connecting to a conduit 3, and an opening 4 on an other end for inserting a tubular plug-in part 5. The other end of the plug-in part 5 includes a connection piece 6 for connecting to an other conduit 7. The other end of the plug-in part 5 also contains a circumferential holding rib 8 located a predetermined distance from the front inserting end.

Figure 5:
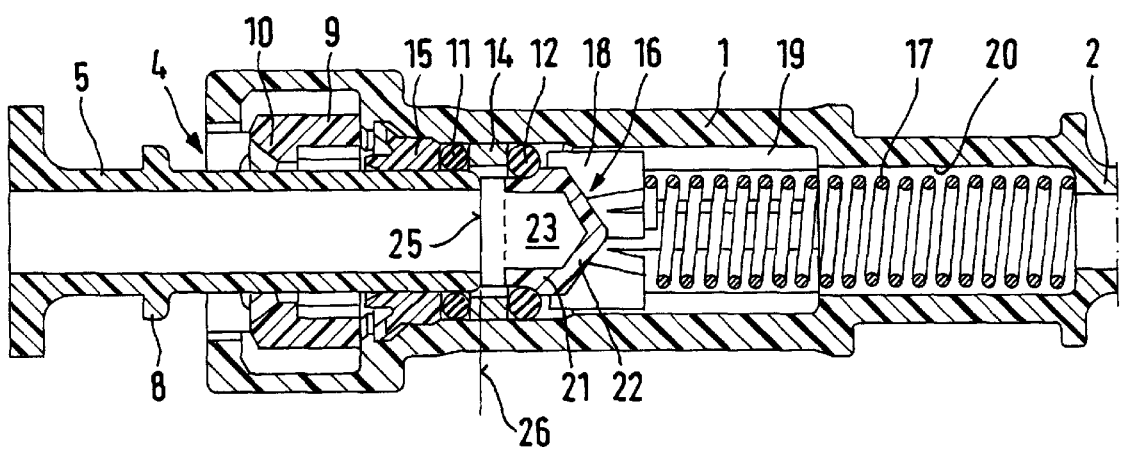
FIG. 5 is a longitudinal sectional view through the closed housing with a partially inserted plug-in part according to the present invention.
Figure 6:
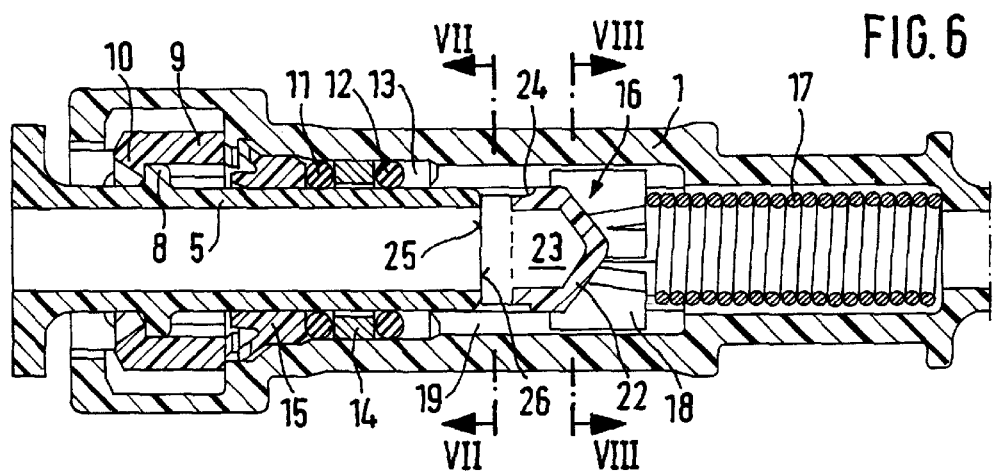
FIG. 6 is a longitudinal sectional view through the housing with a fully inserted plug-in part and the valve body in the open position according to the present invention.
Figure 7:
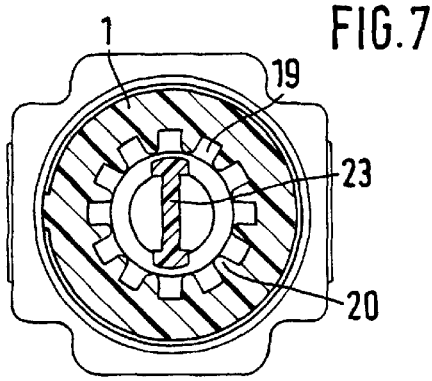
FIG. 7 is a cross sectional view through the housing with the valve body, taken along the line VII-VII in FIG. 6 according to the present invention.

Referring to FIGS. 5 and 6, a locking element 9 with inwardly directed clamping jaws 10 is illustrated. The locking element 9 is springably transverse to the inserting direction, and is installed in the inserting region of the receptacle housing 1. The clamping jaws 10 are pressed apart by the holding rib 8 of the plug-in part 5 during the insertion of the plug-in part 5 in the housing 1 and elastically restored as soon as the rib 8 has passed the clamping jaws 10, such that the plug-in part 5 is engaged in the housing 1 as shown in FIG. 6.

The plug connection includes two ring seals 11 and 12 behind the locking element 9, as viewed in the inserting direction. Preferably, the ring seals 11, 12 seal the annular gap 13 between the receptacle housing 1 and the inserted plug-in part 5. The ring seals 11, 12 are spaced apart by an intermediate ring 14 and axially fixed in the receptacle housing 1 behind the locking element 9 by a spacer 15.

A plug connection also includes a longitudinally displaceable valve body 16 that is supported on the end of the receptacle housing 1 by means of a coil spring 17 positioned in the central flow-through chamber of the receptacle housing 1. When the plug connection is separated, the valve body 16 automatically seals the flow-through chamber, as shown in FIGS. 1 and 2. When the plug-in part 5 is inserted, the valve body 16 is pressed into the open position against the pressure of the coil spring 17 as shown in FIGS. 3 and 4.

It should be appreciated that the valve body 16 is a sleeve 21 that is closed by a conically shaped end wall 22 located on an end of the sleeve that faces away from the inserting opening 4. The interior of the sleeve 21 includes a radial rib 23.

Figure 8:
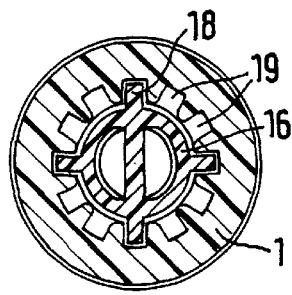
FIG. 8 is a cross sectional view through the housing with the valve body taken along the line VIII-VIII in FIG. 6 according to the present invention.

The valve body 16 is provided with four axially extending, parallel ribs 18, that are uniformly distributed over the circumference on the rear side of the end wall 22. These ribs 18 are disposed within corresponding longitudinal grooves 19 in an inner wall 20 of the receptacle housing 1 (FIG. 8).

It should be appreciated that additional longitudinal grooves 19 are uniformly spaced apart in the wall 20 between the longitudinal grooves 19 for guiding the ribs 18. These additional longitudinal grooves 19 provide for the unobstructed passage of fuel when the valve body 16 is in the open position as shown in FIG. 6.

Preferably, the outer wall of the sleeve 21 of the valve body 16 is widened to form a circumferential contact groove 24. The valve body 16 is pressed against the rear ring seal 12 viewed in the inserting direction in the closed position while the front part of the sleeve 21 extends through the ring seal 12.

Preferably, the radial rib 23 extends beyond the sleeve 21 by a predetermined distance such as the width of the intermediate ring 14. The radial rib 23 includes a terminal edge 25 that is inwardly pressed into the open position away from the end face 26 of the plug-in part 5 during the insertion into the inserting opening.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A plug connection for a conduit used in conveying a fluid, comprising:
    a cylindrical receptacle housing, wherein one end of said housing is attached to the conduit and an other end of the housing is open;
    a tubular plug-in part, wherein an end of said tubular plug-in part is insertable into the opening in the other end of the housing and an other end of said plug-in part is attached to another conduit;
    a longitudinally displaceable valve body disposed within a central flow-through chamber of the receptacle housing, wherein said valve body is in a closed position to seal the flow-through chamber when said tubular plug-in part is disconnected from said receptacle housing;
    a sleeve forming said valve body and having a conically shaped end wall on an end of said sleeve facing away from the inserting opening of the receptacle housing, wherein an interior portion of said sleeve includes a radially extending rib;
    a coil spring disposed in the housing, wherein said valve body is longitudinally displaced by said spring to an open position when said tubular plug-in part is inserted into said receptacle housing;
    at least one ring seal for sealing an annular gap between the receptacle housing and said tubular plug-in part, after said tubular plug-in part is inserted into said receptacle housing; and
    an axial rib extending therealong an exterior circumference of a rear portion of said end wall, wherein said rib is engaged within a corresponding longitudinal groove in an inner wall of the receptacle housing when said tubular plug-in part is inserted into said receptacle housing.

2. A plug connection as set forth in claim 1 further comprising a connection piece attached to one end of said housing for interconnecting said housing to a conduit, and another connection piece attached to an other end of said tubular plug-in part for interconnecting said tubular plug-in part to another conduit.

3. A plug connection as set forth in claim 1 further comprising:
    a locking element having inwardly directed clamping jaws, and located in an inserting portion of said receptacle housing; and
    a circumferential rib arranged a predetermined distance from the inserting end of said tubular plug-in part, wherein said circumferential rib is engaged by said clamping jaw after said tubular plug-in part is inserted into said receptacle housing.

4. A plug connection as set forth in claim 1 including at least three axial ribs extending therealong an exterior circumference of a rear portion of said end wall, wherein said ribs are engaged within a corresponding longitudinal groove in the inner wall of said receptacle housing when said tubular plug-in part is inserted into said receptacle housing.

5. A plug connection as set forth in claim 1, wherein an outer wall of said valve body sleeve is widened to form a circumferential contact groove to retain said valve body against a rear ring seal and an open end of said sleeve extends therethrough said ring seal, when said tubular plug-in part is inserted into said receptacle housing.

6. A plug connection as set forth in claim 5, wherein a portion of said radial rib extends beyond said sleeve, and an edge of the extending portion of said sleeve is inwardly pressed into an open position away from an end face of said terminal plug-in part while inserting said tubular plug-in part into said receptacle housing.

7. A plug connection as set forth in claim 1, wherein an inner wall of said receptacle housing includes a longitudinally extending groove to provide a fluid passage when said tubular plug-in part is inserted into said receptacle housing and said valve body is in an open position.

8. A plug connection for a conduit used in conveying a fluid, comprising:
    a cylindrical receptacle housing having a connection piece positioned on one end of the housing for interconnecting said housing to a conduit, and an other end of the housing is open;
    a tubular plug-in part, wherein an end of said tubular plug-in part is insertable into the opening in the other end of the housing and a connection piece is positioned on an other end of the tubular plug-in part for interconnecting said tubular plug-in part to another conduit;
    a locking element having inwardly directed clamping jaws positioned in an inserting portion of the receptacle housing wherein said clamping jaws are unlocked transverse to an inserting direction of said tubular plug-in part into said receptacle housing;
    a circumferential rib arranged a predetermined distance from the inserting end of said tubular plug-in part, wherein said circumferential rib is engaged by said clamping jaw after said tubular plug-in part is inserted into said receptacle housing;
    at least one ring seal for sealing an annular gap between said receptacle housing and the inserted tubular plug-in part, after said tubular plug-in part is inserted into said receptacle housing;
    a longitudinally displaceable valve body disposed within a central flow-through chamber of the receptacle housing, wherein said valve body is in a closed position to seal the flow-through chamber when said tubular plug-in part is disconnected from said receptacle housing;

a coil spring disposed in the housing, wherein said valve body is longitudinally displaced by said spring to an open position when said tubular plug-in part is inserted into said receptacle housing;

a sleeve forming said valve body and having a conically shaped end wall on an end of said sleeve facing away from the inserting opening of the receptacle housing, wherein an interior portion of said sleeve includes a radially extending rib; and at least three axially extending, parallel ribs distributed over an exterior circumference of a rear portion of said end wall, wherein said ribs are engaged within in corresponding longitudinal grooves in an inner wall of the receptacle housing when said tubular plug-in part is inserted into said receptacle housing.

9. A plug connection as set forth in claim 8, wherein an outer wall of said valve body sleeve is widened to form a circumferential contact groove to retain said valve body against a rear ring seal and an open end of said sleeve extends therethrough said ring seal, when said tubular plug-in part is inserted into said receptacle housing.

10. A plug connection as set forth in claim 9, wherein a portion of said radial rib extends beyond said sleeve, and an edge of the extending portion of said sleeve is inwardly pressed into an open position away from an end face of said terminal plug-in part while inserting said tubular plug-in part said receptacle housing.

11. A plug connection as set forth in claim 10, wherein an inner wall of said receptacle housing includes a longitudinally extending groove to provide a fluid passage when said tubular plug-in part is inserted into said receptacle housing and the valve body is in an open position.

* * * * *